US009868909B2

(12) United States Patent
Urade et al.

(10) Patent No.: US 9,868,909 B2
(45) Date of Patent: *Jan. 16, 2018

(54) PROCESS FOR CONVERTING ONE OR MORE C3—C12 OXYGENATES

(71) Applicant: SHELL OIL COMPANY, Houston, TX (US)

(72) Inventors: Vikrant Nanasaheb Urade, Bangalore (IN); Alan Anthony Del Paggio, Spring, TX (US); Laxmi Narasimhan Chilkoor Soundararajan, Bangalore (IN); Madhusudhan Rao Panchagnula, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 14/758,638

(22) PCT Filed: Dec. 19, 2013

(86) PCT No.: PCT/EP2013/077546
§ 371 (c)(1),
(2) Date: Jun. 30, 2015

(87) PCT Pub. No.: WO2014/102155
PCT Pub. Date: Jul. 3, 2014

(65) Prior Publication Data
US 2015/0337216 A1 Nov. 26, 2015

(30) Foreign Application Priority Data
Dec. 31, 2012 (IN) .............. 5512/CHE/2012

(51) Int. Cl.
C07C 1/20 (2006.01)
C10G 3/00 (2006.01)
C10G 49/08 (2006.01)
C10G 65/02 (2006.01)
C10L 1/04 (2006.01)
C10G 29/20 (2006.01)
C10G 29/22 (2006.01)

(52) U.S. Cl.
CPC .............. *C10G 3/47* (2013.01); *C10G 3/48* (2013.01); *C10G 3/49* (2013.01); *C10G 3/50* (2013.01); *C10G 3/52* (2013.01); *C10G 29/205* (2013.01); *C10G 29/22* (2013.01); *C10G 49/08* (2013.01); *C10G 65/02* (2013.01); *C10L 1/04* (2013.01); *C10G 2300/1011* (2013.01); *C10L 2200/0469* (2013.01); *Y02P 30/20* (2015.11)

(58) Field of Classification Search
CPC .. C07C 1/00; C07C 1/02; C07C 1/207; C07C 1/2072; C07C 1/2074; C07C 1/2076; C07C 1/2078; C10G 3/50; C10G 3/48; C10G 3/42; C10G 49/08; C10G 65/02; C10L 1/04

USPC ........ 585/638, 640, 641, 252, 254, 250, 257
See application file for complete search history.

(56) References Cited

U.S. PATENT DOCUMENTS

| 8,581,013 B2* | 11/2013 | Abhari ............... C10G 3/50 123/1 A |
| 8,629,310 B2* | 1/2014 | Lotero .............. C10L 1/04 585/316 |
| 2008/0280338 A1 | 11/2008 | Hall et al. |
| 2014/0114101 A1* | 4/2014 | Greene ........... C10G 45/58 585/254 |

FOREIGN PATENT DOCUMENTS

| CN | 101233212 A | 7/2008 |
| CN | 101617029 A | 12/2009 |
| CN | 102105561 | 6/2011 |
| CN | 102292310 | 12/2011 |
| WO | 2010053681 | 5/2010 |
| WO | 2010065643 | 6/2010 |
| WO | 2012030646 | 3/2012 |
| WO | 2012057946 | 5/2012 |

OTHER PUBLICATIONS

Vasquez S.T.; "Transformation of Acetone and Isopropanol to Hydrocarbons Using HZSM-5 Catalyst"; Graduate Studies of the Texas A&M University, USA; 2009
Gayubo et al.; "Transformation of Oxygenate Compaonents of Biomass Pyrolysis Oilon a HZSM-5 Zeolite. i. Alcohols and Phenols"; Ind. Eng. Chem. Res.; vol. 43, pp. 2610-2618; 2004.
Gayubo et al.; "Transformation of Oxygenate Components of Biomass Pyrolysis Oil on a HZSM-5 Zeolite. II. Aldehydes, Ketones, and Acids"; Ind. Eng. Chem. Res.; vol. 43; pp. 2619-2626; 2004.

* cited by examiner

Primary Examiner — Sharon Pregler

(57) ABSTRACT

A process for converting one or more C3-C12 oxygenates comprising:
1) contacting a feed comprising C3-C12 oxygenates with hydrogen in the presence of a sulphided hydrogenation catalyst to produce a partially hydrogenated effluent;
2) contacting the partially hydrogenated effluent with hydrogen at a hydrogen partial pressure of at least 0.1 MegaPascal in the presence of a sulphided carbon-carbon coupling catalyst to produce a conversion product;
3) optionally contacting at least part of the conversion product with hydrogen in the presence of a sulphided hydrotreating catalyst and/or a sulphided hydroisomerization catalyst to produce a conversion product; and
4) optionally purifying the conversion product, optionally hydrotreated and/or hydroisomerized, conversion product to obtain a final product,
wherein the carbon-carbon coupling catalyst comprises at least 60 wt % of a zeolite and in the range from 0.1 wt % to 10 wt % of a hydrogenation metal, based on the total weight of the carbon-carbon coupling catalyst.

9 Claims, 1 Drawing Sheet

PROCESS FOR CONVERTING ONE OR MORE C3—C12 OXYGENATES

PRIORITY CLAIM

The present application is the National Stage (§371) of International Application No. PCT/EP2013/077546, filed Dec. 19, 2013, which claims priority from India Patent Application No. 5512/CHE/2012, filed Dec. 31, 2012 incorporated herein by reference.

FIELD OF THE INVENTION

This invention relates to a process for converting one or more C3-C12 oxygenates. Further this invention relates to a process for converting a feed containing one or more C3-C12 oxygenates to a middle distillate boiling product.

BACKGROUND OF THE INVENTION

With increasing demand for liquid transportation fuels, decreasing reserves of 'easy oil' (crude petroleum oil that can be accessed and recovered easily) and increasing constraints on carbon footprints of such fuels, it is becoming increasingly important to develop routes to produce liquid transportation fuels from biomass in an efficient manner. Such liquid transportation fuels produced from biomass are sometimes also referred to as biofuels. Biomass offers a source of renewable carbon. Therefore, when using such biofuels, it may be possible to achieve more sustainable $CO_2$ emissions over petroleum-derived fuels.

WO2010/053681 describes a biofuel production process comprising amongst others converting biomass to alcohol, and synthesizing a liquid hydrocarbon fuel from the alcohol. WO2010/053681 describes several processes for converting the biomass to alcohol. WO2010/053681 further mentions that alcohols may be directly oligomerized to hydrocarbons apparently in the absence of hydrogen at high temperatures (300-450° C.) and moderate pressures (1-40 atm.) in the presence of a zeolite catalyst in an oligomerization reactor (see also FIG. 10 of WO2010/053681). It is further indicated that by controlling the temperature and pressure of the oligomerization process and/or the composition of the zeolite, it is possible to direct the production of longer or shorter chain hydrocarbons. WO2010/053681 further mentions that it is also possible to control the amount of alkane branching in the final product. In its example 1, 27 tonnes of secondary alcohols are oligomerized at 350° C. at 10 atm. in the presence of zeolite catalyst and oxygen to produce 17 tonnes of gasoline and water. The alcohol to gasoline conversion apparently involves also a hydrogenation step. The approximate yield of gasoline based on weight of alcohol feed may be calculated to be approximately 63 wt %.

In its example 5, 27 tonnes of mixed ketones are converted to approximately 28 tonnes of secondary alcohols by hydrogenation over a nickel catalyst at approximately 130° C. and 15 atm hydrogen. The 28 tonnes of secondary alcohols are oligomerized at 350° C. at 10 atm. in the presence of zeolite catalyst to produce 12 tonnes of gasoline, 5 tonnes of light hydrocarbon residuals and 20 tonnes of water. The approximate yield of gasoline based on weight of alcohol feed may be calculated to be approximately 42 wt %.

In his thesis titled "TRANSFORMATION OF ACETONE AND ISOPROPANOL TO HYDROCARBONS USING HZSM-5 CATALYST", obtainable from the Office of Graduate Studies of the Texas A&M University, USA, (December 2009), S. T. Vasquez describes a transformation of acetone and isopropanol to hydrocarbons using a HZSM-5 catalyst. The thesis describes that zeolite solid-acid catalyst HZSM-5 can transform either alcohols or ketones into hydrocarbons. Catalysts having a silica to alumina molar ratio (SAR) of 80 and 280 were used. Vasquez suggests for further studies to modify the catalyst HZSM-5 with metals such as Nickel or Copper.

In the processes of WO2010/053681 and Vasquez deactivation of the prior art catalysts may become an issue when the prior art processes would be applied on a commercial scale in a continuous manner. Without wishing to be bound by any kind of theory it is believed that operating the prior art processes for longer operating times may lead to excessive coking and subsequent deactivation of the catalysts.

For example Gayubo et al. in their article titled "Transformation of Oxygenate components of Biomass Pyrolysis Oil on a HZSM-5 Zeolite. I. Alcohols and Phenols", published in Ind. Eng. Chem. Res. 2004, vol 43, page 2610 to 2618 and their article titled "Transformation of Oxygenate Components of Biomass Pyrolysis Oil on a HZSM-5 Zeolite. II. Aldehydes, Ketones, and Acids" published in *Ind. Eng. Chem. Res.* 2004, 43, 2619-2626 describe the effects of temperature and space time on the transformation over a HZSM-5 zeolite catalyst of several model components of the liquid product obtained by the flash pyrolysis of vegetable biomass (1-propanol, 2-propanol, 1-butanol, 2-butanol, phenol and 2-methoxyphenol). The HZSM-5 zeolite catalyst comprised 30 wt % bentonite, 45 wt % fused alumina and 25 wt % of a HZSM-5 zeolite having a Silica to Alumina molar ratio of 24. They explain that the viability of transforming oxygenates into hydrocarbons was found to be limited by the catalyst deactivation by coke, and that this deactivation effects the product distribution with time on stream. It would be an advancement in the art to provide a process for conversion of a feed containing one or more C3-C12 oxygenate(s), which process can be operated for a prolonged period of time without substantial deactivation of the catalyst.

SUMMARY OF THE INVENTION

It has now been advantageously found that a feed containing one or more C3-C12 oxygenate(s) can be converted to a so-called middle distillate boiling product in a process operated for a prolonged period of time without substantial deactivation of the catalyst by using a specific catalyst in combination with a high hydrogen pressure.

Accordingly the present invention provides a process for converting one or more C3-C12 oxygenates comprising:
1) contacting a feed comprising one or more C3-C12 oxygenates with a source of hydrogen in the presence of a sulphided hydrogenation catalyst to produce a partially hydrogenated effluent;
2) contacting at least part of the partially hydrogenated effluent with a source of hydrogen at a hydrogen partial pressure of at least 0.1 MegaPascal in the presence of a sulphided carbon-carbon coupling catalyst to produce a conversion product;
3) optionally contacting at least part of the conversion product with a source of hydrogen in the presence of a sulphided hydrotreating catalyst and/or a sulphided hydroisomerization catalyst to produce a hydrotreated and/or hydroisomerized conversion product; and
4) optionally purifying the, optionally hydrotreated and/or hydroisomerized, conversion product to obtain a final product, wherein the carbon-carbon coupling catalyst comprises equal to or more than 60 wt % of a zeolite and in the range from equal to or more than 0.1 wt % to equal to or less than 10 wt % of a hydrogenation metal, based on the total weight of the carbon-carbon coupling catalyst.

It has now been found that such a process may advantageously allow for an extended catalyst stability against deactivation due to coke formation and/or due to catalyst poisoning.

In addition, the process according to the invention may advantageously allow one to carry out the conversion in a single reactor or two reactors in series allowing for a more efficient and cost-effective operation.

Further such a process has been found suitable to produce a middle distillate boiling product. This middle distillate boiling product can be obtained in good yields and may advantageously be used in the production of biofuels and/or biochemicals. By a middle distillate boiling product is herein preferably understood a product having a boiling point at 0.1 MegaPascal (MPa) in the range from equal to or more than 140° C. to equal to or less than 370° C. as determined by ASTM method D2887. In addition, the process may advantageously allow one to convert a feed containing two or more distinct C3-C12 oxygenates into a middle distillate boiling product having a smooth distillation curve.

SUMMARY OF THE DRAWINGS

The invention is further illustrated by the following non-limiting drawings.

DETAILED DESCRIPTION OF THE INVENTION

Figure 1:
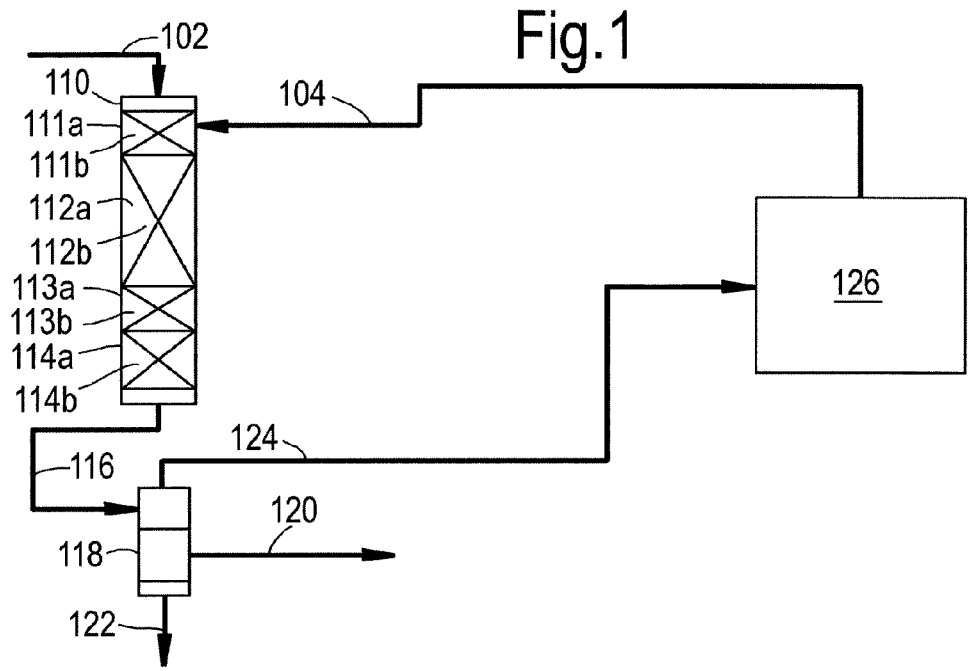
FIG. 1 illustrates a first schematic example of a process according to the invention.

In the process according to the invention a feed comprising one or more C3-C12 oxygenates is converted.

In addition to the one or more C3-C12 oxygenates the feed may comprise one or more other components. Examples of such other components include paraffinic, olefinic and/or aromatic hydrocarbon compounds.

The feed may also contain oxygenates other than the C3-C12 oxygenates, respectively other than the oxygenates as described in the below preferences. In a preferred embodiment, however, the feed contains essentially no oxygenates other than the C3-C12 oxygenates, respectively other than the oxygenates as described in the below preferences.

Preferably the feed comprises at least 50 wt %, more preferably at least 70 wt % (weight percentage), and most preferably at least 90 wt % of one or more C3-C12 oxygenates, based on the total weight of the feed. The feed may for example comprise in the range from equal to or more than 50 wt % to equal to or less than 99.9 wt % or equal to or less than 99.8 wt % of the one or more C3-C12 oxygenates, based on the total weight of the feed. More preferably the feed consists essentially of one or more C3-C12 oxygenates and most preferably the feed consists of one or more C3-C12 oxygenates. As described below, the feed may optionally be spiked with an amount of sulphur in the range from equal to or more than 0.1 wt % to equal to or less than 0.2 wt %, based on the total weight of the feed.

In the embodiments of this invention the one or more C3-C12 oxygenates referred to preferably consist of one or more C3-C10 oxygenates and more preferably consist of one or more C3-C8 oxygenates.

By an oxygenate is herein understood a compound comprising at least one or more carbon atoms, at least one or more hydrogen atoms and at least one or more oxygen atoms. Examples of oxygenates include alkanols, ketones, aldehydes, carboxylic acids, ethers, esters and/or phenolic compounds.

In this invention the one or more oxygenates referred to preferably consist of one or more aldehydes, one or more ketones, one or more alkanols and/or combinations thereof. For example the one or more C3-C12 oxygenates are preferably oxygenates chosen from the group consisting of one or more C3-C12 aldehydes, one or more C3-C12 ketones, one or more C3-C12 alkanols and combinations thereof. More preferably the one or more oxygenates herein referred to consist of one or more aldehydes, one or more ketones and/or combinations thereof. Most preferably the one or more oxygenates herein referred to consist of one or more ketones. For example, the one or more C3-C12 oxygenates referred to herein preferably consist of one or more C3-C12 ketones. The feed may therefore preferably be a feed comprising at least 50 wt %, more preferably at least 70 wt %, and most preferably at least 90 wt % of one or more C3-C12 ketones; more preferably a feed comprising at least 50 wt %, more preferably at least 70 wt %, and most preferably at least 90 wt % of one or more C3-C10 ketones; and most preferably a feed comprising at least 50 wt %, more preferably at least 70 wt %, and most preferably at least 90 wt % of one or more C3-C8 ketones.

By a "Cx"-oxygenate, -ketone, -aldehyde, -carboxylic acid, -ether, -ester or -alkanol is herein understood respectively an oxygenate, ketone, aldehyde, carboxylic acid, ether, ester or alkanol comprising x carbon atoms. By a "Cx-Cy"-oxygenate, -ketone, -aldehyde, -carboxylic acid, -ether, -ester or -alkanol is herein understood respectively an oxygenate, ketone, aldehyde, carboxylic acid, ether, ester or alkanol comprising in the range from equal to or more than "x" to equal to or less than "y" carbon atoms.

Examples of suitable alkanols include primary, secondary, linear, branched and/or cyclic alkanols, such as methanol, ethanol, 1-propanol, 2-propanol, 1-butanol, 2-butanol, pentanol, cyclopentanol, hexanol, cyclohexanol, 2-methyl-cyclopentanonol, heptanol, octanol, nonanol, decanol, undecanol, dodecanol, ethylene glycol, propylene glycol, 1,3-propanediol, butanediol, pentanediol, hexanediol, heptanediol, octanediol, nonanediol, decanediol, undecanediol, dodecanediol, isomers thereof and/or mixtures thereof.

Examples of ketones include hydroxyketones, oxo-aldehydes, cyclic ketones and/or diketones, such as acetone, propanone, 2-oxopropanal, butanone, butane-2,3-dione, 3-hydroxybutane-2-one, pentanone, cyclopentanone, pentane-2,3-dione, pentane-2,4-dione, pentatrione, hexanone, hexane-2,3-dione, hexane-2,4-dione, hexane-2,5-dione, hexane-3,4-dione, hexane-triones, cyclohexanone, 2-methyl-cyclopentanone, heptanones, octanones, nonanones, decanones, undecanones, dodecanones, 2-oxopropanal, 2-oxo-butanal, 3-oxo-butanal, isomers thereof and/or mixtures thereof.

Examples of aldehydes include acetaldehyde, propionaldehyde, butyraldehyde, pentanal, hexanal, heptanal, octanal, nonal, decanal, undecanal, dodecanal, isomers thereof and/or mixtures thereof.

Examples of carboxylic acids include formic acid, acetic acid, propionic acid, butanoic acid, pentanoic acid, hexanoic acid, heptanoic acid, isomers thereof, and/or mixtures thereof.

Any ethers are preferably ethers with alkyl groups containing in the range from 1 to 6 carbon atoms. Examples of ethers include dimethyl ether, diethyl ether, methyl ethyl ether, diphenyl ether, methyl phenyl ether, ethyl phenyl ether, and/or mixtures thereof.

Any esters are preferably esters of carboxylic acids containing in the range from 2 to 6 carbon atoms and alcohols containing in the range from 1 to 4 carbon atoms. Examples of esters include methyl acetate, ethyl acetate, methyl propanoate, ethyl propanoate, methyl butanoate, ethyl butanoate and/or mixtures thereof.

The process according to the invention is further especially advantageous when the feed contains a plurality of two or more C3-C12 oxygenates or more preferably when the feed contains a plurality of three or more C3-C12 oxygenates. It has advantageously been found that even when a plurality of two or more distinctive C3-C12 oxygenates, or more preferably a plurality of three or more distinctive C3-C12 oxygenates, is fed to the process of the invention, still a middle distillate boiling product can be obtained that has a smooth boiling range distribution. By two or more distinctive oxygenates is herein for example understood two or more C3-C12 oxygenates comprising different numbers of carbon atoms.

The feed may be obtained from any source known to be suitable for this purpose by the person skilled in the art.

Preferably the feed is derived from a biomass material. By a biomass material is herein preferably understood a material which contains bio-based carbon atoms as determined in ASTM method D6866-10 titled "Standard Test Methods for Determining the Biobased Content of Solid, Liquid and Gaseous samples using Radiocarbon Analysis". Examples of such biomass material include cellulosic material, lignocellulosic material, oils, fats and proteins. By a cellulosic material is herein preferably understood a material containing cellulose, and optionally lignin and/or hemicellulose. By a lignocellulosic material is herein preferably understood a material containing cellulose and lignin and optionally hemicellulose.

In a preferred embodiment the feed may at least partly be derived from a biomass material by means of fermentation. Examples of suitable fermentation. Examples of suitable biomass materials include cellulose containing municipal wastes; food waste; agricultural wastes such as corn stover, soybean stover, corn cobs, rice straw, rice hulls, oat hulls, corn fibre, cereal straws such as wheat, barley, rye and oat straw; grasses; waste paper; sugar processing residues such as bagasse and beet pulp; or mixtures thereof.

In addition to the C3-C12 oxygenates the feed in the process according to the invention may contain in the range from equal to or more than 150 to equal to or less than 2000 ppmw (parts per million by weight) sulphur and/or in the range from equal to or more than 300 to equal to or less than 5000 ppmw nitrogen. Such sulphur and/or nitrogen may suitably originate from the biomass material, for example from proteins, from which the feed may be derived.

In step 1) of the process according to the invention the feed comprising one or more C3-C12 oxygenates is contacted with a source of hydrogen in the presence of a sulphided hydrogenation catalyst to produce a partially hydrogenated effluent.

The hydrogenation catalyst in step 1) may be any kind of hydrogenation catalyst known by the person skilled in the art to be suitable for hydrogenation. In a preferred embodiment the hydrogenation catalyst comprises one or more hydrogenation metal(s) on a support. Preferably the one or more hydrogenation metals are chosen from the group consisting of nickel, cobalt, molybdenum, tungsten, copper, iron, ruthenium and combinations thereof. Preferably the support is a metal oxide, such as for example alumina, silica or silica alumina. If the support contains alumina, this alumina is preferably gamma-alumina. Sulphiding of the hydrogenation catalyst may conveniently be carried out as described in more detail herein below.

The source of hydrogen is preferably hydrogen gas.

The hydrogenation in step 1) is suitably carried out such that only a partial hydrogenation is achieved. That is, the one or more C3-C12 oxygenates in the feed are suitably hydrogenated without complete hydrodeoxygenation.

In step 2) at least part of the partially hydrogenated effluent is contacted with a source of hydrogen at a hydrogen partial pressure of at least 0.1 MegaPascal in the presence of a sulphided carbon-carbon coupling catalyst to produce a conversion product.

The carbon-carbon coupling catalyst comprises equal to or more than 60 wt % of a zeolite and in the range from equal to or more than 0.1 wt % to equal to or less than 10 wt % of a hydrogenation metal, based on the total weight of the carbon-carbon coupling catalyst. The zeolite preferably comprises 10-membered and/or 12-membered ring channels and a Silica to Alumina molar Ratio (SAR) in the range from equal to or more than 10 to equal to or less than 300.

The carbon-carbon coupling catalyst according to the invention may herein below sometimes also be referred to as conversion catalyst. By a carbon-carbon coupling catalyst is herein preferably understood a catalyst that is capable of coupling two compounds, each of which compounds contains at least carbon and hydrogen, via a carbon-carbon bond under conditions suitable therefore. An example of a carbon-carbon coupling catalyst is a so-called oligomerization catalyst.

By a 10-membered respectively a 12-membered ring channel is herein preferably understood a channel defined by rings having 10 tetrahedral atoms respectively having 12 tetrahedral atoms in the ring. Examples of tetrahedral atoms include silicon and aluminium. The zeolite may contain 10-membered ring channels, 12-membered ring channels or a combination thereof. In addition to the 10-membered ring channels and/or 12-membered ring channels the zeolite may contain additional ring channels having a different number of tetrahedral atoms in the ring, preferably such additional ring channels are ring channels having less than 10 tetrahedral atoms in the ring.

The ring channels may for example be arranged in a one-dimensional, two-dimensional or three-dimensional network.

In one embodiment the zeolite is preferably a zeolite that has a Silica to Alumina Molar Ratio (SAR) in the range from equal to or more than 10 to equal to or less than 100 before modification with a hydrogenation metal, and more preferably a zeolite that has a SAR in the range from equal to or more than 10 to equal to or less than 40 before modification with a hydrogenation metal. A carbon-carbon coupling catalyst with a zeolite having a SAR in these ranges before modification with a metal advantageously allows for improved stability of the catalyst towards deactivation. In addition the use of a carbon-carbon coupling catalyst with a zeolite having a SAR in these ranges may advantageously result in a good yield of so-called middle distillate boiling products.

In another embodiment the zeolite preferably has a Silica to Alumina Molar Ratio (SAR) in the range from equal to or more than 250 to equal to or less than 300 before modification with a hydrogenation metal. The use of a carbon-carbon coupling catalyst with a zeolite having a SAR in these ranges may advantageously result in a good yield of gasoline products.

Preferably the zeolite is a zeolite chosen from the group consisting of MFI-type zeolites, FER-type zeolites, BEA-type zeolites, MOR-type zeolites, FAU type zeolites and combinations thereof. By a certain type of zeolite, such as for example an MFI-type zeolite, is herein preferably understood a zeolite with a certain framework type, such as for example a zeolite with an MFI-framework type. These different zeolite framework types are for example defined in the "Atlas of Zeolite Framework types", sixth revised edition, published by Elsevier B. V. in 2007. Preferred examples of zeolites that can be comprised in the carbon-carbon coupling catalyst include ZSM-5, Mordenite zeolite, zeolite Beta, Y-zeolite or combinations thereof.

The carbon-carbon coupling catalyst further comprises a hydrogenation metal. The carbon-carbon coupling catalyst may comprise one or more hydrogenation metals. Preferably the carbon-carbon coupling catalyst comprises one or more hydrogenation metals chosen from the group consisting of copper, molybdenum, tungsten, cobalt and nickel. In addition the carbon-carbon coupling catalyst may comprise one or more other hydrogenation metals. More preferably the carbon-carbon coupling catalyst only contains hydrogenation metals chosen from the group consisting of nickel, cobalt, molybdenum, copper, tungsten and combinations thereof.

The carbon-carbon coupling catalyst preferably comprises in the range from equal to or more than 0.5 wt % to equal to or less than 10 wt % hydrogenation metal, based on the total weight of the carbon-carbon coupling catalyst. More preferably the carbon-carbon coupling catalyst comprises in the range from equal to or more than 0.5 wt % to equal to or less than 5 wt % of the hydrogenation metal, based on the total weight of the carbon-carbon coupling catalyst. Most preferably the carbon-carbon coupling catalyst comprises in the range from equal to or more than 1.0 wt % to equal to or less than 3.5 wt % of the hydrogenation metal, based on the total weight of the carbon-carbon coupling catalyst.

For practical purposes the weight percentages of hydrogenation metal and/or the zeolite as specified herein are best determined based on the total weight of the carbon-carbon coupling catalyst before sulphiding of the catalyst.

In addition to the zeolite and the hydrogenation metal, the carbon-carbon coupling catalyst may optionally comprise one or more binders and/or fillers. An example of a binder is silica sol. Examples of fillers include amorphous alumina, amorphous silica, or amorphous silica-alumina, boehmite alumina (AlOOH), natural or synthetic clays, pillared or delaminated clays, or mixtures of one or more of these. Examples of clays include kaolin, hectorite, sepiolite and attapulgite.

Preferably the carbon-carbon coupling catalyst comprises equal to or more than 70 wt %, more preferably equal to or more than 80 wt %, possibly even as high as equal to or more than 90 wt %, of the zeolite, based on the total weight of the carbon-carbon coupling catalyst. More preferably the carbon-carbon coupling catalyst comprises in the range from equal to or more than 60.0 wt % to equal to or less than 99.9 wt %, even more preferably in the range from equal to or more than 70.0 wt % to equal to or less than 95.0 wt %, still more preferably in the range from equal to or more than 70.0 wt % to equal to or less than 85.0 wt % of the zeolite, based on the total weight of the carbon-carbon coupling catalyst. The balance may consist of one or more hydrogenation metals and/or one or more binders and/or fillers.

The carbon-carbon coupling catalyst may be prepared in any manner known to be suitable to the skilled person in the art to prepare a catalyst comprising a zeolite and a hydrogenation metal as described above. For example the carbon-carbon coupling catalyst may be prepared by ion-exchange of the zeolite with an aqueous metal salt solution containing the hydrogenation metal; deposition of the hydrogenation metal on the zeolite by means of impregnation; and/or co-mulling of the zeolite and the hydrogenation metal.

In a preferred embodiment the carbon-carbon coupling catalyst is prepared by ion-exchange of the zeolite with an aqueous solution containing one or more salts of one or more hydrogenation metals. Preferably the one or more hydrogenation metal(s) is/are one of the preferred hydrogenation metals as described above. As indicated above, the most preferred hydrogenation metals include nickel, cobalt, molybdenum, copper, tungsten and combinations thereof. In addition, the carbon-carbon coupling catalyst may contain for example ruthenium and/or iron.

The aqueous solution containing one or more salts of one or more hydrogenation metals is herein also abbreviated as "metal salt solution". Preferably the metal salt solution is prepared by dissolving the one or more hydrogenation metal salts in deionized water. Preferably the metal salt solution has a concentration in the range from equal to or more than 0.5 mol hydrogenation metal/liter water to equal to or less than 3 mol hydrogenation metal/liter water. Before carrying out the ion-exchange, the pH of the metal salt solution is preferably adjusted to a pH in the range from equal to or more than 5 to equal to or less than 10, preferably by addition of an ammonium containing solution or by the addition of aqueous ammonia.

Preferences for the zeolite are as described above. In one embodiment the zeolite preferably has a SAR in the range from equal to or more than 10 to equal to or less than 100, more preferably in the range from equal to or more than 10 to equal to or less than 40, before it is contacted with the hydrogenation metal. Preferably the zeolite before ion exchange with the metal salt solution, is a zeolite in the ammonium form. A zeolite in the ammonium form can for example be obtained by exchanging any known non-ammonium cations (such as H+ or Na+) by an ammonium ion or by precipitating the zeolite in the ammonium form.

Preferably the zeolite is a zeolite powder comprising crystalline particles, which crystalline particles have a particle size distribution with an average particle size in the range from 0.05 micrometers to 10 micrometers. These crystalline particles can agglomerate into bigger particles. The particle size can for example be determined by a laser scattering particle size distribution analyzer.

The carbon-carbon coupling catalyst may for example be prepared by a process comprising the steps of:
i) adding and/or suspending a zeolite, which zeolite comprises 10-membered and/or 12-membered ring channels and which zeolite has a Silica to Alumina molar Ratio (SAR) in the range from equal to or more than 10 to equal to or less than 300, into an aqueous metal salt solution, which aqueous metal salt solution comprises in the range from equal to or more than 0.5 to equal to or less than 3.0 mol of a hydrogenation metal per liter of water and which aqueous metal salt solution has a pH in the range from equal to or more than 5 to equal to or less than 10, wherein the zeolite is added and/or suspended in the aqueous metal salt solution in a ratio of grams zeolite to milliliters aqueous metal salt solution in the range from equal to or more than 0.05 to equal to or less than 0.33 grams of zeolite per milliliter of aqueous metal salt solution to produce a zeolite slurry;

ii) heating the zeolite slurry for a time period in the range from equal to or more than 30 minutes to equal to or less than 2 hours at a temperature in the range from equal to or more than 60° C. to equal to or less than 100° C. to produce a ion-exchanged zeolite slurry;

iii) cooling the ion-exchanged zeolite slurry to a temperature equal to or below 55° C. to produce a cooled ion-exchanged zeolite slurry;

iv) recovering the ion-exchanged zeolite from the cooled ion-exchanged zeolite slurry to produce a recovered ion-exchanged zeolite and optionally washing the recovered ion-exchanged zeolite;

v) drying the recovered ion-exchanged zeolite at a temperature in the range from equal to or more than 80° C. to equal to or less than 150° C. for a time period of equal to or more than 1 hour, preferably in air, to produce a dried ion-exchanged zeolite;

vi) calcining the dried ion-exchanged zeolite in air at a temperature in the range of from equal to or more than 400° C. to equal to or less than 600° C. for a time period in the range from 30 minutes to 12 hours to produce a calcined ion-exchanged zeolite;

vii) extruding the calcined ion-exchanged zeolite with a binder and/or a filler in a weight ratio of weight calcined ion-exchanged zeolite to total weight of any binder and/or any filler in the range from equal to or more than 60:40 to equal to or less than 90:10, preferably to equal to or less than 80:20, to produce an extrudate;

viii) re-calcining the extrudate at a temperature in the range from equal to or more than 400° C. to equal to or less than 550° C. for a time period in the range from 30 minutes to 12 hours to produce a carbon-carbon coupling catalyst.

The produced carbon-carbon coupling catalyst may subsequently be sulphided to produce the sulphided carbon-carbon coupling catalyst. Preferences for such sulphiding are described herein below.

In step 2) at least part of the partially hydrogenated effluent is contacted with a source of hydrogen at a hydrogen partial pressure of at least 0.1 MegaPascal.

The source of hydrogen is preferably hydrogen gas.

Preferably the hydrogen partial pressure is at least 1.0 MegaPascal, more preferably the hydrogen partial pressure lies in the range from equal to or more than 2.0 MPa to equal to or less than 20.0 MPa, more preferably between 2.5 MPa to 18.0 MPa, even more preferably between 3.0 MPa and 15.0 MPa.

Preferably the hydrogen is provided at a hydrogen to feed (i.e. here the feed is the partially hydrogenated effluent of step 1) at ratio in the range from equal to or more than 200 to equal to or less than 5000, more preferably in the range from equal to or more than 400 to equal to or less than 2500 Nl $H_2$/kg feed (normal liter hydrogen per kg feed, where a normal liter is understood to refer to a liter of gas at a pressure of 0.1 MPa (MegaPascal) and at a temperature of 20° C.)

Hence, in a continuous process, instead of or in addition to contacting the partially hydrogenated effluent of step 1) in the presence of the sulphided carbon-carbon coupling catalyst with a source of hydrogen at a specific hydrogen partial pressure, the partially hydrogenated effluent of step 1) may be contacted in the presence of the sulphided carbon-carbon coupling catalyst with hydrogen at a hydrogen to feed (i.e. the partially hydrogenated effluent of step 1) ratio in the range from equal to or more than 200 to equal to or less than 5000 Nl $H_2$/kg feed.

Preferably the partially hydrogenated effluent of step 1) is contacted with hydrogen in the presence of the sulphided carbon-carbon coupling catalyst at a temperature in the range from equal to or more than 250° C. to equal to or less than 450° C., more preferably a temperature in the range from equal to or more than 280° C. to equal to or less than 380° C., even more preferably a temperature in the range from equal to or more than 320° C. to equal to or less than 370° C.

Preferably the partially hydrogenated effluent of step 1) is contacted with hydrogen in the presence of the sulphided carbon-carbon coupling catalyst at a Weight Hourly Space Velocity (WHSV) in the range from 0.2 to 2.5 kg feed per kg catalyst per hour.

By contacting the partially hydrogenated effluent of step 1) with hydrogen in the presence of the sulphided carbon-carbon coupling catalyst as described herein, a conversion product may be produced. This conversion product may herein also be referred to as carbon-carbon coupled product. By a carbon-carbon coupled product is understood a product containing one or more carbon-carbon coupled compounds. An example of a carbon-carbon coupled product is an oligomerization product. The conversion product may advantageously contain a middle distillate boiling product. Hence, after contacting the feed with the sulphided carbon-carbon coupling catalyst as described herein, advantageously a middle distillate boiling product may be produced. As indicated before, by a middle distillate boiling product is herein preferably understood a product having a boiling point at 0.1 MegaPascal (MPa) in the range from equal to or more than 140° C. to equal to or less than 370° C. as determined by ASTM method D2887. Examples of such middle distillate boiling products include kerosene/jet fuel range hydrocarbons and diesel range hydrocarbons. Suitably the conversion product may contain in the range from equal to or more than 30 wt %, more preferably equal to or more than 40 wt %, to equal to or less than 75 wt %, more preferably equal to or less than 65 wt %, of middle distillate boiling product. The remainder may be compounds having another boiling point.

The conversion product may suitably contain one or more carbon-carbon coupled compounds. By a "carbon-carbon coupled compound" is herein preferably understood a compound that has been obtained by coupling two other compounds via a carbon-carbon bond. Preferably the conversion product contains a mixture of hydrocarbon compounds. By a hydrocarbon compound is herein understood a compound containing at least carbon and hydrogen. Such a hydrocarbon compound may optionally also contain heteroatoms such as oxygen, sulphur or nitrogen. In one embodiment, the average molecular weight of the hydrocarbon compounds in the conversion product is higher than the average molecular weight of the hydrocarbon compounds in the feed. Preferably the conversion product contains one or more hydrocarbon compounds having in the range from equal to or more than 6 carbon atoms to equal to or less than 25 carbon atoms, preferably equal to or less than 18 carbon atoms.

The conversion product may comprise unsaturated, saturated, straight and/or branched hydrocarbon compounds. Further, the conversion product may still contain hydrocarbon compounds comprising heteroatoms such as oxygen, sulphur and/or nitrogen. In a preferred embodiment, the concentration of such heteroatoms in the conversion product is already reduced compared to the concentration thereof in the feed. In an especially preferred embodiment the conversion product contains already less than 100 ppmw or essentially no oxygen.

It may be considered advantageous to increase the saturation and/or the branching of the one or more hydrocarbon compounds in the conversion product and/or to reduce the content of oxygen, sulphur and/or nitrogen therein. And even when the conversion product contains less than 100 ppmw or essentially no oxygen, it may be still be considered advantageous to increase the saturation and/or the branching of the hydrocarbon compounds in the carbon-carbon coupled product.

In a preferred embodiment the process according to the invention therefore further comprises contacting at least part of the conversion product with a source of hydrogen in the presence of a sulphided hydrotreating catalyst and/or a sulphided hydroisomerization catalyst to produce a hydrotreated and/or hydroisomerized conversion product (step 3).

By a hydrotreating catalyst is preferably understood a catalyst that is capable of converting unsaturated carbon-carbon bonds into saturated carbon-carbon bonds and/or a catalyst that is capable of removing heteroatoms such as oxygen, nitrogen and sulphur. Preferably the hydrotreating catalyst is a hydrodeoxygenation catalyst, a hydrodesulphurization catalyst and/or a hydrodenitrogenation catalyst. By a hydroisomerization catalyst is preferably understood a catalyst that is capable of converting unbranched hydrocarbon compounds into branched hydrocarbon compounds and/or of converting mono-branched hydrocarbon compounds into multiple branched hydrocarbon compounds.

The hydrotreating and/or hydroisomerization catalyst can be any hydrotreating and/or hydroisomerization catalyst known to be suitable for the purpose of hydrotreating and/or hydroisomerization by the person skilled in the art. Preferably the hydrotreating catalyst and/or hydroisomerization catalyst are sulphided. Such sulfurization can be carried out as described herein below.

In one preferred embodiment the hydrotreating and/or hydroisomerization catalyst comprises, nickel or cobalt promoted, molybdenum or tungsten on a support. Examples of such catalysts include sulphided nickel-molybdenum on a support; sulphided cobalt-molybdenum on a support; sulphided nickel-tungsten on a support; and sulphided cobalt-tungsten on a support. The support preferably comprises a metal oxide, such as alumina, silica or silica alumina. If the hydroisomerization and/or hydrotreating catalyst contains alumina, this alumina is preferably gamma-alumina.

As a result of the hydrotreatment/hydroisomerization the percentage of saturated and/or branched hydrocarbon compounds in the conversion product may be increased; and/or the content of non-carbon, non-hydrogen atoms such as sulphur, nitrogen and/or oxygen in the conversion product may be reduced.

Any hydrotreatment and/or hydroisomerization is preferably carried out at a temperature in the range from 250° C. to 380° C.; a hydrogen partial pressure in the range from 1 to 15 MPa (MegaPascal); a Weight Hourly Space Velocity (WHSV) in the range from 0.2 kg liquid feed/(kg catalyst.hr) to 2.5 kg liquid feed/(kg catalyst.hr); and/or a hydrogen to liquid feed ratio in the range from 200 Nl hydrogen/kg liquid feed to 3000 Nl hydrogen/kg liquid feed (in this step the feed may be the liquid conversion product).

Sulfiding of the hydrotreatment catalyst and/or hydroisomerizaiton catalyst can suitably be carried out as described herein below.

After hydrotreatment and/or hydroisomerization a hydrotreated and/or hydroisomerized conversion product may be obtained. Such hydrotreated and/or hydroisomerized conversion product may have an increased percentage of saturated and/or branched hydrocarbon compounds and/or a reduced content of non-carbon, non-hydrogen atoms such as sulphur, nitrogen and/or oxygen.

In a preferred embodiment the hydrotreated and/or hydroisomerized conversion product is a mixture containing one or more n-paraffinic, isoparaffinic, olefinic, naphthenic, and/or aromatic hydrocarbon compounds.

The content of olefinic hydrocarbon compounds in the hydrotreated and/or hydroisomerized conversion product preferably varies from equal to or more than 0 wt % to equal to or less than 10 wt %, based on the total weight of the hydrotreated and/or hydroisomerized conversion product.

The content of aromatic hydrocarbon compounds in the hydrotreated and/or hydroisomerized conversion product preferably varies from equal to or more than 0.1 wt % to equal to or less than 45 wt %, based on the total weight of the hydrotreated and/or hydroisomerized conversion product.

The content of naphthenic hydrocarbon compounds in the hydrotreated and/or hydroisomerized conversion product preferably varies from equal to or more than 0.1 wt % to equal to or less than 45 wt %, based on the total weight of the hydrotreated and/or hydroisomerized conversion product.

The content of n-paraffinic hydrocarbon compounds in the hydrotreated and/or hydroisomerized conversion product preferably varies from equal to or more than 0.5 wt % to equal to or less than 75 wt %, based on the total weight of the hydrotreated and/or hydroisomerized conversion product.

The content of isoparaffinic hydrocarbon compounds in the hydrotreated and/or hydroisomerized conversion product preferably varies from equal to or more than 0.5 wt % to equal to or less than 50 wt % (wt % refers to percentage by weight), based on the total weight of the hydrotreated and/or hydroisomerized conversion product.

In addition to carbon and hydrogen, the hydrotreated and/or hydroisomerized conversion product may contain other atoms such as sulfur, nitrogen and oxygen. However, the sulfur content of the hydrotreated and/or hydroisomerized conversion product is preferably reduced to a content of less than 100 ppmw, more preferably less than 10 ppmw. The nitrogen content of the hydrotreated and/or hydroisomerized conversion product is preferably reduced to a content less than 300 ppmw, and more preferably to less than 50 ppmw. The oxygen content of the hydrotreated and/or hydroisomerized conversion product is preferably reduced to a content of less than 2 wt %, preferably less than 0.5 wt %, and most preferably less than 0.2 wt %.

The process according to the invention further preferably comprises purifying the, optionally hydrotreated and/or hydroisomerized, conversion product to obtain a final product (step 4). Preferably this final product is a middle distillate boiling product.

A middle distillate boiling product can conveniently be obtained from the, optionally hydrotreated and/or hydroisomerized, conversion product by any means known to be suitable by the person skilled in the art. Such means include for example fractionation, distillation and/or phase separation.

The process according to the invention may advantageously be used to prepare a plurality of hydrocarbon compounds that may be of use as a biofuel component and/or a biochemical component.

In a preferred embodiment therefore at least part of the, conversion product and/or at least part of the hydrotreated and/or hydroisomerized conversion product is blended with one or more other components and used in a fuel. For example a, preferably hydrotreated and/or hydroisomerized, middle distillate boiling product may be blended with one or more additives to produce a biofuel.

The catalysts may suitably be sulphided ex-situ (i.e. outside the process) or in-situ (i.e. during the process) or both to produce sulphided catalysts.

In one preferred embodiment the respective catalyst(s) is/are sulphided by a liquid phase sulphiding procedure. In such a liquid phase sulphiding procedure the respective catalyst(s) is/are contacted with a liquid containing in the range from equal to or more 0.1 wt % to equal to or less than 3.5 wt % of sulphur, more preferably in the range from equal to or more than 1.5 wt % to equal to or less than 3.5 wt % of sulphur at a temperature in the range from equal to or more than 200° C. to equal to or less than 400° C., more preferably at a temperature in the range from equal to or more than 300° C. to equal to or less than 380° C., in the presence of hydrogen.

The sulphur-containing liquid can for example be the feed for that specific catalyst, which may be spiked with sulphur, or for example another hydrocarbon containing liquid that additionally contains sulphur.

A preferred example of such a hydrocarbon containing liquid that additionally contains sulphur is a so-called straight run gasoil containing sulphur. Conveniently the liquid phase sulphiding with such a hydrocarbon containing liquid that additionally contains sulphur may be carried out in a reactor, where a catalyst is first sulphided in the reactor by contacting it with the hydrocarbon-containing liquid and subsequently the hydrocarbon-containing liquid is replaced by the feed comprising the one or more C3-C12 oxygenates.

In another preferred embodiment the respective catalyst(s) is/are sulphided by spiking the feed comprising the one or more C3-C12 oxygenates with sulphur containing compounds to produce a feed containing in the range from equal to or more than 0.1 wt % to equal to or less than 0.2 wt % sulphur and preferably maintaining this sulphur level throughout the process. Examples of such one or more sulphur containing compounds include dimethyldisulphide (DMDS) or SULFRZOL® 54 (SULFRZOL® 54 is a trademark, the sulphur containing compound is commercially available from Lubrizol).

In a further preferred embodiment sulphiding of the respective catalyst(s) can be accomplished by gas-phase sulphiding with a $H_2S/H_2$ mixture as the sulfiding medium. Such a $H_2S/H_2$ mixture preferably comprises in the range from 0.1 and 5 vol % $H_2S$ based on the total volume of the $H_2S/H_2$ mixture.

One skilled in the art will understand that a combination of the above preferred sulphiding embodiments is also possible.

In a preferred embodiment the sulphided catalyst(s) is/are kept in the sulphided state by carrying out the process in the presence of hydrogensulphide. The hydrogensulphide may be provided as such or may be generated in-situ. In a preferred embodiment the hydrogensulphide may be generated by spiking the feed with one or more sulphur containing compounds. Preferably the feed may be spiked with an amount of sulphur in the range form equal to or more than 0.1 wt % to equal to or less than 0.2 wt %. Examples of such one or more sulphur containing compounds include dimethyldisulphide (DMDS) or SULFRZOL® 54 (SULFRZOL® 54 is a trademark, the sulphur containing compound is commercially available from Lubrizol).

The process according to the invention may for example be carried out as a batch process, a semi-batch process or a continuous process. Preferably the process according to the invention is a continuous process.

The process according to the invention may be carried out in any kind of reactor, including for example a fixed bed reactor or a moving, ebullated or slurry bed reactor.

In a preferred embodiment the process according to the invention is carried out in one or more fixed bed reactor.

Conveniently each of the steps in the process according to the invention may be carried out in a separate catalyst bed. These catalyst beds may be combined in one or more reactors or may be located in separate reactors. More preferably the process according to the invention is carried out in a single reactor, most preferably a single fixed bed reactor.

Preferably the reactor may comprise a catalyst bed containing the carbon-carbon coupling catalyst, preceded by a catalyst bed containing the hydrogenation catalyst and optionally followed by one or more catalyst beds containing a hydrotreatment and/or hydroisomerization catalyst.

One example of a process according to the invention has been illustrated in FIG. 1. In FIG. 1 a feed comprising one or more C3-C12 ketones (102) and a hydrogen gas (104) are supplied to a reactor (110) comprising a stacked bed comprising a first catalyst bed (111a) containing a sulphided hydrogenation catalyst (111b); a second catalyst bed (112a) containing a sulphided carbon-carbon coupling catalyst (112b), a third catalyst bed (113a) containing a sulphided hydrotreating catalyst (113b) and a fourth catalyst bed (114a) containing a sulphided hydroisomerization catalyst (114b). In the reactor (110) the feed (102) is contacted with the hydrogen gas (104). In the first catalyst bed (111a) containing the sulphided hydrogenation catalyst (111b) the one or more C3-C12 ketones from the feed (102) are hydrogenated in order to convert them into one or more C3-C12 alkanols, without complete hydrodeoxygenation. In addition sulphur and or nitrogen may be removed from the feed. In the second catalyst bed (112a) containing a sulphided carbon-carbon coupling catalyst (112b) the C3-C12 alkanols and any unconverted C3-C12 ketones are carbon-carbon coupled into compounds having a higher molecular weight than the C3-C12 ketones in the feed. For example the ketones and/or alkanols may undergo reactions such as oligomerization or concatenation reactions, aldol condensation reactions, cyclization reactions and/or aromatization reactions. In the third catalyst bed (113a) containing the sulphided hydrotreating catalyst (113b) the effluent of the previous catalyst beds is further hydrodeoxygenated. Since the product of the first two catalyst beds (111a and 112a) is a mixture of compounds consisting only of carbon and hydrogen and compounds containing hydrogen, carbon and oxygen, and since it is desired that the final product be a product comprising only compounds consisting of carbon and hydrogen, oxygen and other heteroatoms are removed in the third catalyst bed (113a) with the help of the sulphided hydrotreating catalyst (113b). In the third catalyst bed (113a) also hydrogenation of unsaturates such as olefins and aromatics is accomplished and a saturated hydrocarbon product containing essentially no heteroatoms is obtained. Finally, especially with a feed containing 2-ketones, the product of the third catalyst bed (113a) may contain hydrocarbon compounds that are linear or have only methyl branching on the second carbon atom. Such unbranched or minimally branched hydrocarbon compounds may have poor octane numbers and high pour points. In the fourth catalyst bed (114a) containing the sulphided hydroisomerization catalyst (114b) these linear or minimally branched hydrocarbon compounds are therefore hydroisomerized to increase octane number and decrease pour point.

Contacting of the feed (102) and the hydrogen gas (104) in the reactor (110) is carried out under a hydrogen atmosphere at a hydrogen partial pressure in the range from 8.0 to 15.0 MegaPascal and a temperature in the range from 320° C. to 400° C. As explained herein, the elevated hydrogen partial pressure helps in retarding the deactivation of the sulphided carbon-carbon coupling catalyst due to coke formation.

The effluent (116) from the reactor (110) is separated in separator (118) into a hydrocarbon liquid phase (120), an aqueous phase (122), and a gasphase (124). The gasphase (124) contains hydrogen, saturated C1-C3 hydrocarbon compounds, hydrogen sulphide (H2S), ammonia (NH3), carbonmonoxide (CO), carbon dioxide (CO2) and carbonylsulphide (COS). The gasphase (124) is forwarded to a purification and steam reformer section (126). The saturated C1-C3 hydrocarbon compounds are used as a feed for the steam reformer in section (126). In the steam reformer of section (126) hydrogen gas is generated that can be conveniently recycled to the reactor (110) as a source of hydrogen (104).

Figure 2:
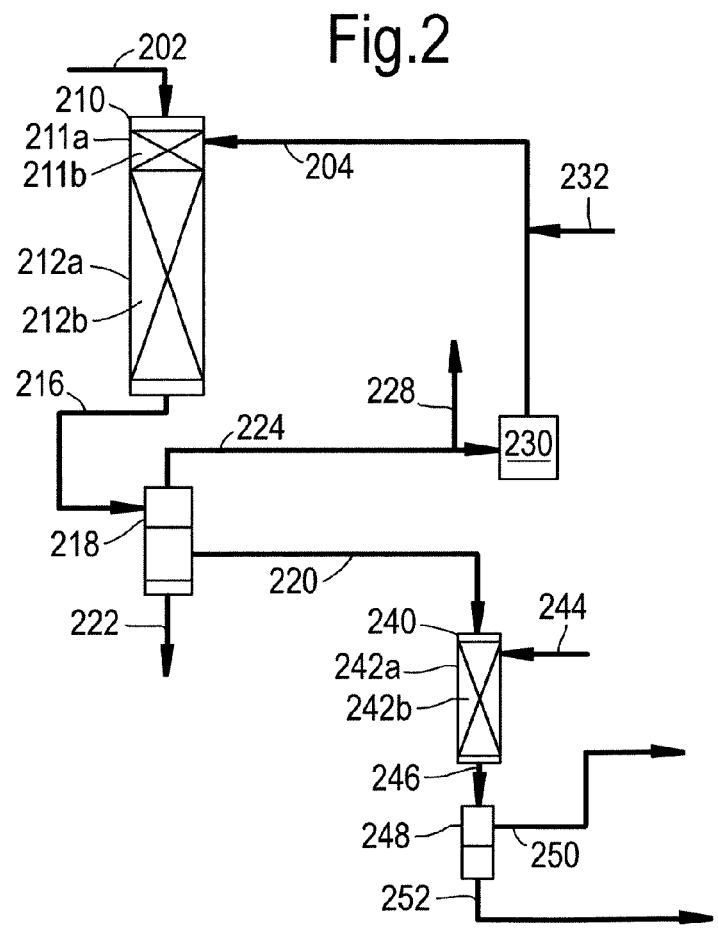
FIG. 2 illustrates a second schematic example of a process according to the invention.

In FIG. 2 another example of a process according to the invention has been provided. In FIG. 2 a feed (202) comprising one or more C3-C12 ketones and a gas stream (204) containing hydrogen and C1-C3 gases are supplied to a first reactor (210) comprising a stacked bed comprising a first catalyst bed (211a) containing a hydrogenation catalyst (211b) and a second catalyst bed (212a) containing a sulphided carbon-carbon coupling catalyst (212b). In the reactor (210) the feed (202) is contacted with the hydrogen gas from gas stream (204). In the first catalyst bed (211a) containing the hydrogenation catalyst (211b) the one or more C3-C12 ketones from the feed (202) are partially or wholly hydrogenated into C3-C12 alkanols without doing a complete hydrodeoxygenation. The hydrogenation catalyst (211b) may also remove heteroatoms such as sulphur and nitrogen from the feed (202). In the second catalyst bed (212a) containing a sulphided carbon-carbon coupling catalyst (212b) the C3-C12 alkanols and any unconverted C3-C12 ketones are carbon-carbon coupled into compounds having a higher molecular weight than the C3-C12 ketones in the feed. For example in the second catalyst bed (212a) reactions such as the dehydration of alcohols to produce olefins and the oligomerization of olefins to produce larger hydrocarbons are carried out. In addition unconverted ketones can be converted into hydrocarbons or oxygenates with a higher molecular weight. The product of the second catalyst bed (212a) and the product of the first reactor (210) may therefore comprise hydrocarbon compounds consisting only of carbon and hydrogen, but also oxygenated compounds (that is, compounds containing hydrogen, carbon and oxygen). The effluent (216) from the reactor (210) is separated in separator (218) into a hydrocarbon liquid phase (220), an aqueous phase (222), and a gasphase (224).

Part of the gasphase (224) may be purged via purge stream (228) and another part of the gasphase may be recycled via recycle compressor (230) to gas stream (204). Fresh hydrogen can be added via hydrogen make-up stream (232).

The hydrocarbon liquid phase (220) is forwarded to a second reactor (240). The second reactor (240) contains a catalyst bed (242a) containing a hydrotreatment catalyst (242b). In the second reactor (240) a gas stream containing fresh or recycled hydrogen (244) is contacted with the hydrocarbon liquid phase (220) in the presence of the hydrotreatment catalyst (242b) to remove any residual oxygen from the hydrocarbon liquid phase (220) and to saturate any olefins and aromatics. In addition to a hydrotreatment catalyst (242b) in a top catalyst bed, the second reactor (240) may optionally contain a hydroisomerization catalyst in a bottom catalyst bed (not shown) to hydroisomerize n-paraffins and/or n-olefins obtained from the hydrotreatment catalyst in the top bed. It is also possible to omit the first hydrogenation catalyst (211b) in the first reactor (210) and contact the ketones directly with the sulphided carbon-carbon coupling catalyst (212b).

The effluent (246) from the second reactor can be separated in a second separator (248) into a gasphase (250) and a hydrocarbon liquid product (252).

An advantage of the two reactor line-up of FIG. 2 is the ability to recycle unsaturated C2-C3 gases which can be oligomerized. Since in the two-reactor line-up of FIG. 2 the hydrotreatment catalyst is situated in a separate second reactor, the hydrocarbons coming from the first reactor may remain unsaturated. After recycling, C2-C3 hydrocarbon compounds that are unsaturated can oligomerize further into gasoline and diesel range hydrocarbons. Recycling of the unsaturated C2-C3 hydrocarbon compounds thus helps in increasing overall liquid fuel yields.

That which is claimed is:

1. A process for converting one or more C3-C12 oxygenates comprising:
   a. contacting a feed comprising one or more C3-C12 oxygenates with a source of hydrogen in the presence of a sulphided hydrogenation catalyst to produce a partially hydrogenated effluent;
   b. contacting at least part of the partially hydrogenated effluent with a source of hydrogen at a hydrogen partial pressure of at least 0.1 MegaPascal in the presence of a sulphided carbon-carbon coupling catalyst to produce a conversion product;
   c. optionally contacting at least part of the conversion product with a source of hydrogen in the presence of a sulphided hydrotreating catalyst and/or a sulphided hydroisomerization catalyst to produce a hydrotreated and/or hydroisomerized conversion product; and
   d. optionally purifying the, optionally hydrotreated and/or hydroisomerized, conversion product to obtain a final product, comprising a middle distillate boiling product, wherein the carbon-carbon coupling catalyst comprises equal to or more than 60 wt % of a zeolite and in the range from at least 0.1 wt % to at most 10 wt % of a hydrogenation metal, based on the total weight of the carbon-carbon coupling catalyst.

2. The process according to claim 1, wherein the zeolite of the carbon-carbon coupling catalyst comprises 10-membered and/or 12-membered ring channels and a Silica to Alumina Molar Ratio (SAR) in the range from equal to or more than 10 to equal to or less than 300.

3. The process according to claim 1, wherein the carbon-carbon coupling catalyst comprises in the range from equal to or more than 0.5% wt to equal to or less than 5 wt % of a hydrogenation metal, based on the total weight of the carbon-carbon coupling catalyst.

4. The process according to claim 1, wherein step 2) comprises contacting at least part of the partially hydrogenated effluent with a source of hydrogen at a hydrogen partial pressure of at least 1.0 MegaPascal in the presence of a sulphided carbon-carbon coupling catalyst to produce a conversion product.

5. The process according to claim 1 wherein step 2) comprises contacting at least part of the partially hydrogenated effluent with a source of hydrogen in the presence of a sulphided carbon-carbon coupling catalyst at a temperature in the range from at least 250° C. to at most 450° C.

6. The process according to claim 1 wherein the feed comprises sulphur in a concentration in the range from at least 150 ppmw to at most 2000 ppmw.

7. The process according to claim 1 wherein the process is carried out in a single reactor.

8. The process according to claim 7, wherein the reactor comprises a catalyst bed containing the carbon-carbon coupling catalyst preceded by a catalyst bed containing the hydrogenation catalyst and optionally followed by one or more catalyst beds containing a hydrotreatment and/or hydroisomerization catalyst.

9. The process according to claim 1 wherein a middle distillate boiling product is produced.

* * * * *